(12) United States Patent
Shinyashiki et al.

(10) Patent No.: US 8,119,277 B2
(45) Date of Patent: Feb. 21, 2012

(54) STACK TYPE BATTERY

(75) Inventors: Yoshitaka Shinyashiki, Moriguchi (JP);
Atsuhiro Funahashi, Moriguchi (JP);
Hitoshi Maeda, Moriguchi (JP);
Masayuki Fujiwara, Moriguchi (JP)

(73) Assignee: SANYO Electric Co., Ltd., Osaka (JP)

( * ) Notice: Subject to any disclaimer, the term of this patent is extended or adjusted under 35 U.S.C. 154(b) by 708 days.

(21) Appl. No.: 12/232,916

(22) Filed: Sep. 25, 2008

(65) Prior Publication Data

US 2009/0197162 A1    Aug. 6, 2009

(30) Foreign Application Priority Data

Sep. 28, 2007   (JP) ................... 2007-253460

(51) Int. Cl.
*H01M 2/26* (2006.01)
(52) U.S. Cl. ......................... 429/161; 429/211
(58) Field of Classification Search .......... None
See application file for complete search history.

(56) References Cited

U.S. PATENT DOCUMENTS

| | | | | |
|---|---|---|---|---|
| 6,387,567 | B1 * | 5/2002 | Noh ............................. | 429/211 |
| 2004/0038122 | A1 | 2/2004 | Hisamitsu et al. .......... | 429/120 |
| 2006/0222935 | A1 * | 10/2006 | Takahashi et al. ........... | 429/142 |
| 2008/0060189 | A1 | 3/2008 | Daidoji et al. ............... | 29/623.1 |
| 2008/0070111 | A1 | 3/2008 | Abe et al. ..................... | 429/163 |

FOREIGN PATENT DOCUMENTS

| | | |
|---|---|---|
| JP | 2003-282044 A | 10/2003 |
| JP | 2006-324093 A | 11/2006 |
| JP | 2008-060407 A | 3/2008 |
| WO | 2008/013381 A1 | 1/2008 |

* cited by examiner

*Primary Examiner* — Jonathan Crepeau
(74) *Attorney, Agent, or Firm* — Kubovcik & Kubovcik

(57) ABSTRACT

A stack type battery has positive electrode current collector tabs (11) overlapped with each other and welded to a positive electrode current collector terminal (15), and negative electrode current collector tabs (12) overlapped with each other and welded to a negative electrode current collector terminal (16). The positive electrode current collector tabs (11) existing between the positive electrode plates (1) and an end part (15a) of the positive electrode current collector terminal (15) that is on the positive electrode plate (1) side are welded to each other and/or the negative electrode current collector tabs (12) existing between the negative electrode plates (2) and an end part (16a) of the negative electrode current collector terminal (16) that is on a negative electrode plate (2) side are welded to each other.

7 Claims, 13 Drawing Sheets

STACK TYPE BATTERY

BACKGROUND OF THE INVENTION

1. Field of the Invention

The present invention relates to stack type batteries used for, for example, robots, electric vehicles, and backup power sources, more particularly to stack type lithium ion batteries that can improve charge-discharge characteristics at high rate.

2. Description of Related Art

In recent years, batteries have been used for not only the power source of mobile information terminal devices such as mobile telephones, notebook computers, and PDAs but also for such applications as robots, electric vehicles, and backup power sources. This has led to a demand for higher capacity batteries. Because of their high energy density and high capacity, lithium secondary batteries are widely utilized as the power sources for such applications as described above.

The battery configurations of lithium ion secondary batteries are broadly grouped into two types: cylindrical type, in which a spirally wound electrode assembly is enclosed in a closed-end cylindrical battery case, and stack type, in which a stacked electrode assembly comprising plurality of stacks of rectangular-shaped electrodes is enclosed in a closed-end prismatic battery case or a battery case prepared by welding two laminate films together or welding the peripheral portions of a folded laminate film together.

Of the above-described lithium ion secondary batteries, the latter type employs a stacked electrode assembly, in which a required number of sheet-shaped positive electrode plates each having a positive electrode current collector tab and a required number of sheet-shaped negative electrode plates each having a negative electrode current collector tab are stacked with a separator interposed between each of the electrodes. The plurality of positive electrode tabs are overlapped with each other and ultrasonic welded to a positive electrode current collector terminal, while the plurality of negative electrode tabs are likewise overlapped with each other and are ultrasonic welded to a negative electrode current collector terminal (see Japanese Published Unexamined Patent Application Nos. 2003-282044 and 2006-324093).

As described above, the capacity of lithium ion secondary batteries has been increasing in recent years. Accordingly, the number of the positive and negative electrode plates stacked has tended to increase. In addition, the thickness of the positive and negative electrode current collector terminals tends to be made greater, taking into consideration that the battery is charged and discharged at high rate. Consequently, a large number of positive/negative electrode current collector tabs overlapped with each other need to be ultrasonic welded to a thick metal plate (current collector terminal). However, weldability of the weld points tends to be poorer because there is a thickness difference between the positive/negative electrode current collector terminal and the positive/negative electrode current collector tabs and also because a large number of current collector tabs need to be welded simultaneously. This results in variations in the connection resistance values between the positive/negative electrode plates and the positive/negative electrode current collector terminal, so the current values passing through the electrode plates become non-uniform especially when the battery is charged/discharged at high rate (specifically, a large current flows through a portion in which the connection resistance value between the positive/negative electrode plates and the positive/negative terminal is small, while a small current flows through a portion in which the connection resistance value between the positive/negative electrode plates and the positive/negative electrode current collector terminal is large). As a consequence, uneven distribution of the charge-discharge conditions occurs in the battery. This causes partial overdischarge or overcharge in the battery, leading to poor battery cycle performance.

The present invention has been accomplished in view of the foregoing problems, and it is an object of the invention to provide a stack type battery that can minimize deterioration in battery cycle performance even when charge-discharge operations are performed at high rate, by preventing variations in connection resistance values between the positive/negative electrode plates and the positive/negative electrode current collector terminals.

BRIEF SUMMARY OF THE INVENTION

In order to accomplish the foregoing and other objects, the present invention provides a stack type battery comprising: a stacked electrode assembly having a plurality of positive electrode plates, a plurality of negative electrode plates, and separators, the positive electrode plates and the negative electrode plates being alternately stacked one upon the other with the separators interposed therebetween; positive electrode current collector tabs each made of a metal foil and extending outward from the plurality of positive electrode plates; negative electrode current collector tabs each made of a metal foil and extending outward from the plurality of negative electrode plates; a plate-shaped positive electrode current collector terminal; and a plate-shaped negative electrode current collector terminal, the positive electrode current collector tabs being overlapped with each other and welded to the plate-shaped positive electrode current collector terminal, and the negative electrode current collector tabs being overlapped with each other and welded to the plate-shaped negative electrode current collector terminal, wherein the positive electrode current collector tabs existing between the positive electrode plates and an end part of the positive electrode current collector terminal that is on the positive electrode plate side are joined to each other, and/or the negative electrode current collector tabs existing between the negative electrode plates and an end part of the negative electrode current collector terminal that is on the negative electrode plate side are joined to each other.

According to the present invention, variations in connection resistance values between the positive/negative electrode plates and the positive/negative electrode current collector terminal can be prevented. As a result, deterioration in battery cycle performance can be minimized even when charge-discharge operations are performed at high rate.

BRIEF DESCRIPTION OF THE DRAWINGS

FIG. 3 illustrates a portion of the stack type battery of the present invention, wherein FIG. 3(a) shows a plan view of the positive electrode, FIG. 3(b) shows a perspective view of the separator, and FIG. 3(c) shows a plan view illustrating a pouch-type separator in which the positive electrode is disposed;

DETAILED DESCRIPTION OF THE INVENTION

Figure 1:
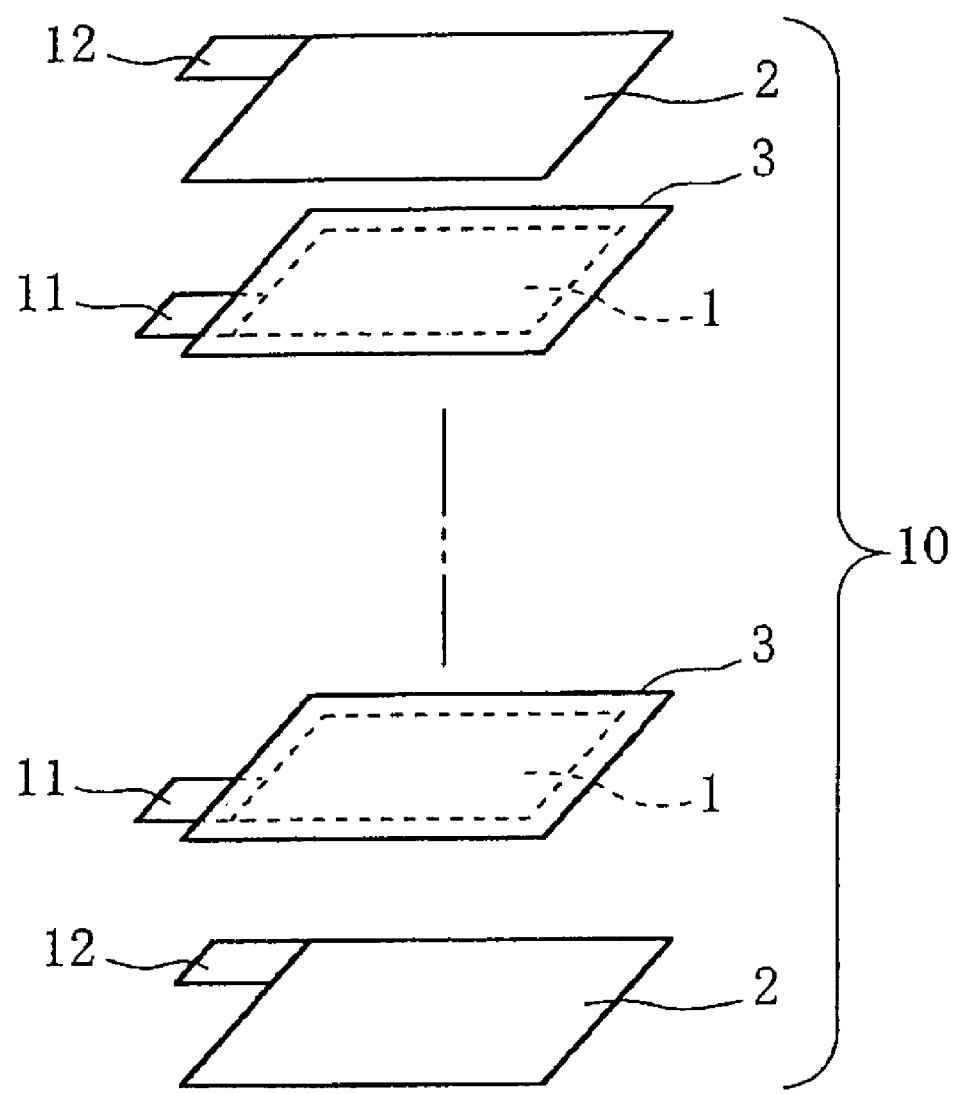
FIG. 1 is an exploded perspective view illustrating a stacked electrode assembly used for a stack type battery according to the present invention.

A stack type battery according to the present invention comprises: a stacked electrode assembly having a plurality of positive electrode plates, a plurality of negative electrode plates, and separators, the positive electrode plates and the negative electrode plates being alternately stacked one upon the other with the separators interposed therebetween; positive electrode current collector tabs each made of a metal foil and extending outward from the plurality of positive electrode plates; negative electrode current collector tabs each made of a metal foil and extending outward from the plurality of negative electrode plates; a plate-shaped positive electrode current collector terminal; and a plate-shaped negative electrode current collector terminal. The positive electrode current collector tabs are overlapped with each other and welded to the plate-shaped positive electrode current collector terminal, and the negative electrode current collector tabs are overlapped with each other and welded to a plate-shaped negative electrode current collector terminal. The positive electrode current collector tabs existing between the positive electrode plates and an end part of the positive electrode current collector terminal that is on the positive electrode plate side are joined to each other, and/or the negative electrode current collector tabs existing between the negative electrode plates and an end part of the negative electrode current collector terminal that is on the negative electrode plate side are joined to each other.

According to the just-described configuration, variations in the connection resistance values between the positive/negative electrode plates and the positive/negative electrode current collector terminal can be prevented even when the weldability of the weld portions between the positive/negative current collector terminal and the positive/negative current collector tabs is poor, because the positive electrode current collector tabs existing between the positive electrode plates and the end part of the positive electrode current collector terminal that is on the positive electrode plate side and/or the negative electrode current collector tabs existing between the negative electrode plates and the end part of the negative electrode current collector terminal that is on the negative electrode plate side are electrically connected respectively to each other. Therefore, even when charge-discharge operations are performed at high rate, uniformity in the currents flowing through the electrode plates is ensured, and uneven distribution of the charge-discharge conditions in the battery is prevented from occurring. As a result, partial overdischarge and overcharge are prevented, and battery cycle performance is improved.

It is desirable that the number of each of the positive electrode plates and the negative electrode plates be 30 or greater.

When the number of each of the positive electrode plates and the negative electrode plates is 30 or greater, weldability of the weld portion between the positive/negative current collector terminal and the positive/negative current collector tabs tend to be particularly poor. In such a case, the advantageous effects of the present invention will be significant.

It is desirable that the joining be effected by ultrasonic welding.

In the case that the joining is effected by ultrasonic welding, the welding may be performed with a small output power since extremely thin current collector tabs are welded to each other (since the welding is carried out in the absence of the thick positive/negative current collector terminals). As a result, deformation of the positive/negative current collector tabs arising from the impact of welding can be minimized. Therefore, adhesion of the positive/negative current collector tabs to each other improves, resulting in uniform connection resistance values. In addition, welding strength is greater when the ultrasonic welding is used.

It should be noted that the invention does not eliminate the possibility of employing resistance welding and laser welding.

It is also desirable that the joining be effected by thrust-and-press clamping.

When the joining is effected by thrust-and-press clamping, the joining process may be performed with simple equipment. Therefore, manufacturing costs of the battery can be reduced. The term "thrust-and-press clamping" herein refers to a technique of joining metal foils by piercing the foils with a needle or the like to produce burrs and then press-clamping the foils.

It is desirable that the joining be effected at a substantially halfway location between the positive electrode plates and the end part of the positive electrode current collector terminal that is on the positive electrode plate side and/or at a substantially halfway location between the negative electrode plates and the end part of the negative electrode current collector terminal that is on the negative electrode plate side.

It is possible to effect the above-described joining at a location near the positive/negative electrode plates or the current collector terminals. However, if the joining is effected at such a location, stress is applied to the joined portions since the stacked electrode assembly and the current collector terminals have a large thickness (the stacked electrode assembly particularly has a very large thickness), so problems such as peeling may occur at the joined portions. In contrast, when the joining is effected at a substantially halfway location between the positive electrode plates (or the negative electrode plates) and the end part of the positive electrode current collector terminal (or the negative electrode current collector terminal) that is on the positive electrode plate side (or the negative electrode plate side), the above-mentioned stress is lessened. As a result, problems such as peeling can be prevented from occurring at the joined portion.

In particular, the stacked electrode assembly is larger in thickness than the current collector terminals, so it is desirable that the joining is effected at a substantially halfway location that is nearer the current collector terminals.

It is desirable that the joining be effected at a plurality of locations.

Although the joining may be effected at one location, the welding strength can be improved further when the joining is effected at a plurality of locations.

It is desirable that the plurality of joining locations be disposed linearly so as to be perpendicular to an extending direction of the positive electrode current collector tabs or the negative electrode current collector tabs.

When the joining is not formed linearly so as to be perpendicular to the extending direction of the positive electrode current collector tabs, the joining may be made at a location near the positive/negative electrode plates and the current collector terminals. In such a case, stress may act on the joined portion, and problems may arise such as peeling at the joined portion, as described above.

It is desirable that a positive electrode active material of the positive electrode plates and a negative electrode active material used of the negative electrode plates comprise a material capable of intercalating and deintercalating lithium.

When the invention is applied to a lithium ion battery in which the positive electrode active material and the negative electrode active material are made of a material capable of intercalating and deintercalating lithium, the cycle performance at high rate can be improved remarkably when a higher battery capacity is intended to be achieved by increasing the number of stacked positive/negative electrode plates in the battery.

Hereinbelow, a prismatic lithium ion battery according to one embodiment of the present invention will be described with reference to FIGS. 1 through 8. It should be construed, however, that the stack type battery according to this invention is not limited to the following embodiments and examples but various changes and modifications are possible without departing from the scope of the invention.

Structure of Prismatic Lithium Ion Battery

Figure 2:
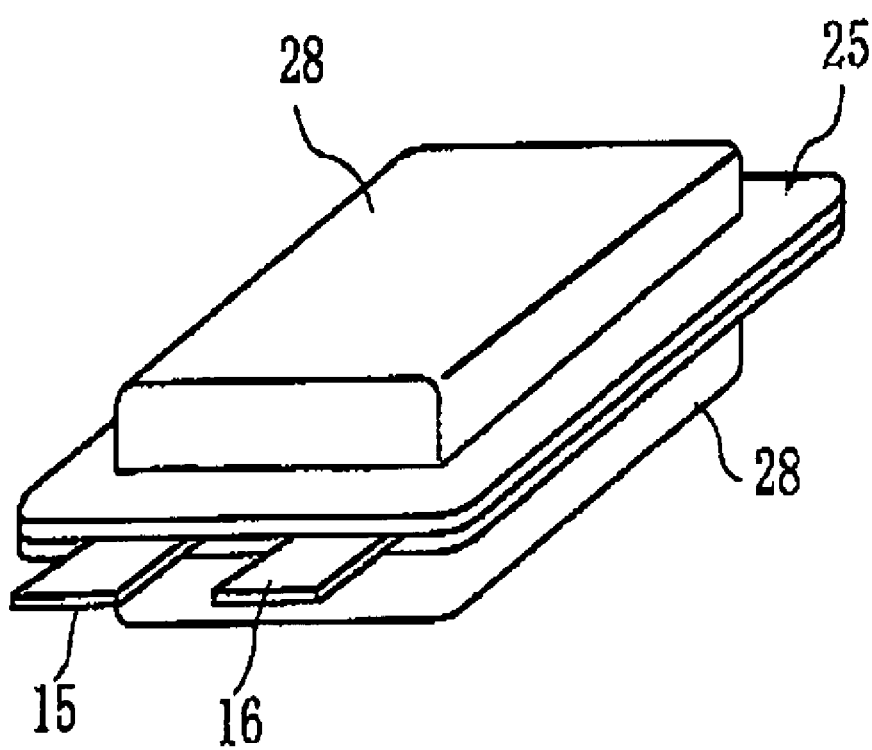
FIG. 2 is a perspective view illustrating a stack type battery according to the present invention.
Figure 3:
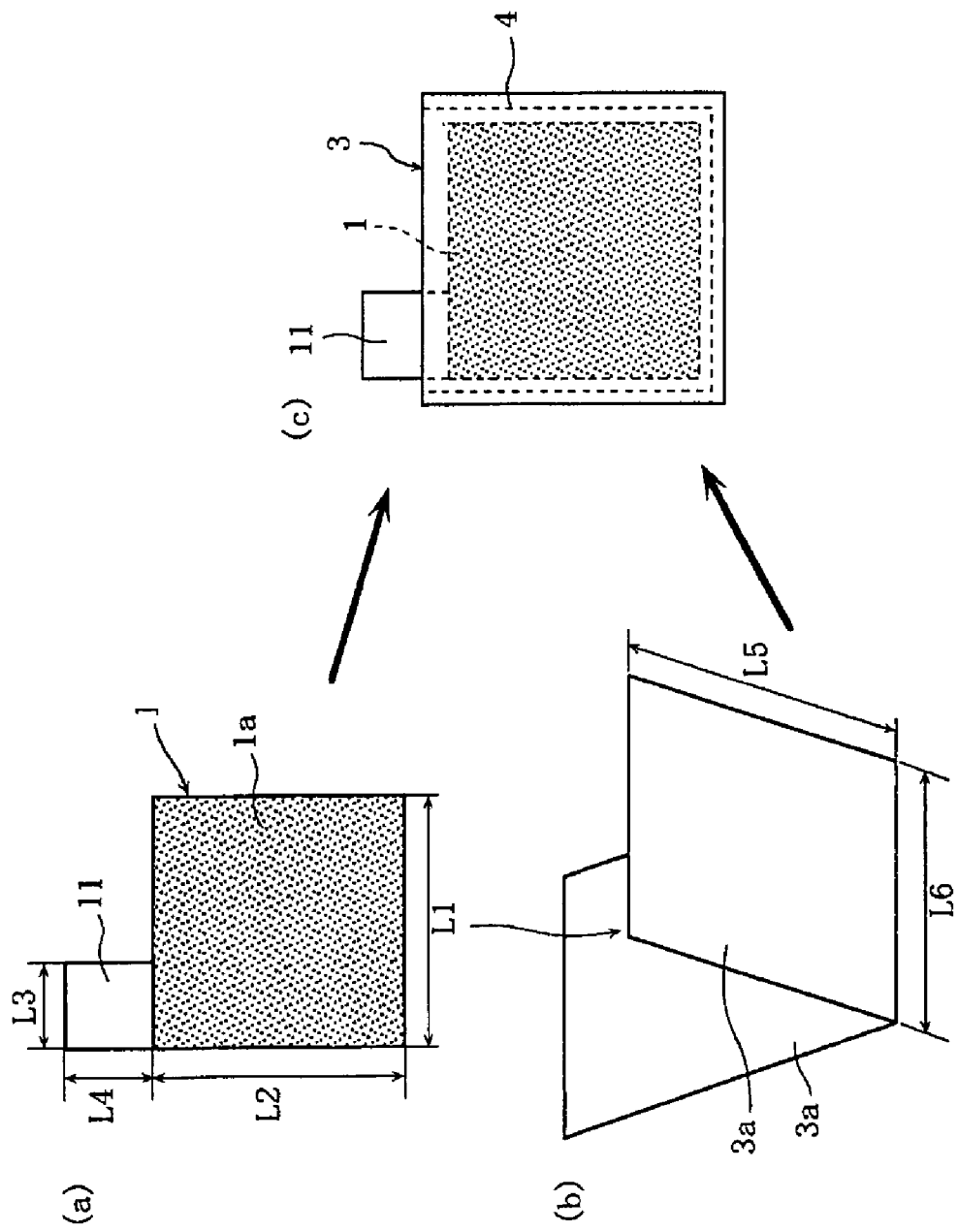

As illustrated in FIG. 1, an example of the prismatic lithium ion battery according to the present invention comprises a stacked electrode assembly 10. In the stacked electrode assembly 10, pouch-type separators 3 and negative electrode plates 2 are disposed alternately, and the outermost stacks are constituted by negative electrode plates 2. Each of the pouch-type separators 3 is made of two sheets of separators and contains a positive electrode plate 1 therein. Since the outermost stacks need to be constituted by negative electrode plates 2, the stacked electrode assembly 10 is configured so that the number of the negative electrode plates 2 is greater by one than that of the positive electrode plates 1 (specifically, the stacked electrode assembly 10 contains 50 sheets of positive electrode plates 1 and 51 sheets of negative electrode plates 2). The stacked electrode assembly 10 is enclosed in a battery case 25, as shown in FIG. 2, formed by welding two laminate films 28, together with an electrolyte solution. A later-described positive electrode current collector terminal 15 and a later-described negative electrode current collector terminal 16 protrude from the battery case 25.

As illustrated in FIG. 3(a), each of the positive electrode plates 1 has a positive electrode active material layer 1a disposed over the entire surfaces of both sides of a positive electrode conductive current collector made of a rectangular-shaped aluminum foil (thickness: 15 μm). The positive electrode active material layer 1a comprises a positive electrode active material made of $LiCoO_2$, a conductive agent made of carbon black, and a binder agent made of polyvinylidene fluoride. The positive electrode plate 1 has a width L1 of 95 mm and a height L2 of 115 mm. A positive electrode current collector tab 11 (width L3: 30 mm, height L4: 20 mm) protrudes from one side of the positive electrode plate 1. The positive electrode current collector tab 11 is formed integrally with the positive electrode conductive current collector and is not provided with the positive electrode active material layer 1a.

The structure of the pouch-type separator 3 is as follows. As illustrated in FIG. 3(c), two separators 3a each made of polypropylene (PP) are overlapped with each other. A weld portion 4 for welding the separators 3a to each other is provided at the peripheral portion of the separator 3a. With this structure, the positive electrode plate 1 can be accommodated inside the pouch-type separator 3. Referring to FIG. 3(b), the separator 3a has a rectangular shape with a width L6 of 100 mm and a height L5 of 120 mm, and the thickness is 30 μm.

Figure 4:
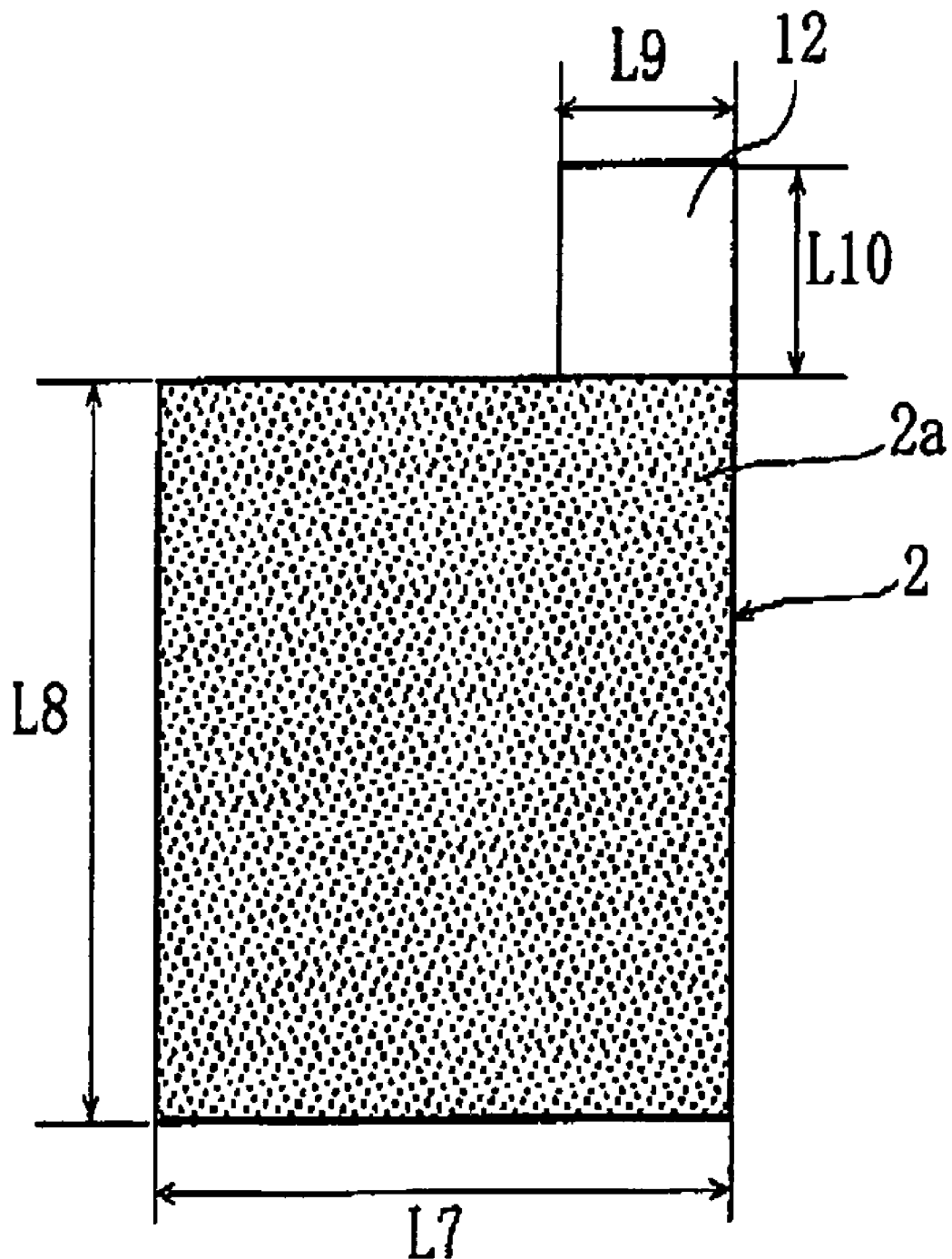
FIG. 4 is a plan view illustrating a negative electrode used for the stack type battery of the present invention.

As illustrated in FIG. 4, each of the negative electrode plates 2 has a negative electrode active material layer 2a disposed over the entire surfaces of both sides of a negative electrode conductive current collector made of a rectangular-shaped copper foil (thickness: 10 μm). The negative electrode active material layer 2a comprises a negative electrode active material made of natural graphite and a binder agent made of polyvinylidene fluoride. The negative electrode plate 2 has a width L7 of 100 mm and a height L8 of 120 mm, which are the same dimensions as those of the separator 3a. A negative electrode current collector tab 12 (width L9: 30 mm, height L10: 20 mm) protrudes from one side of the negative electrode plate 1. The negative electrode current collector tab 12 is formed integrally with the negative electrode conductive current collector and is not provided with the negative electrode active material layer 2a.

Figure 5:
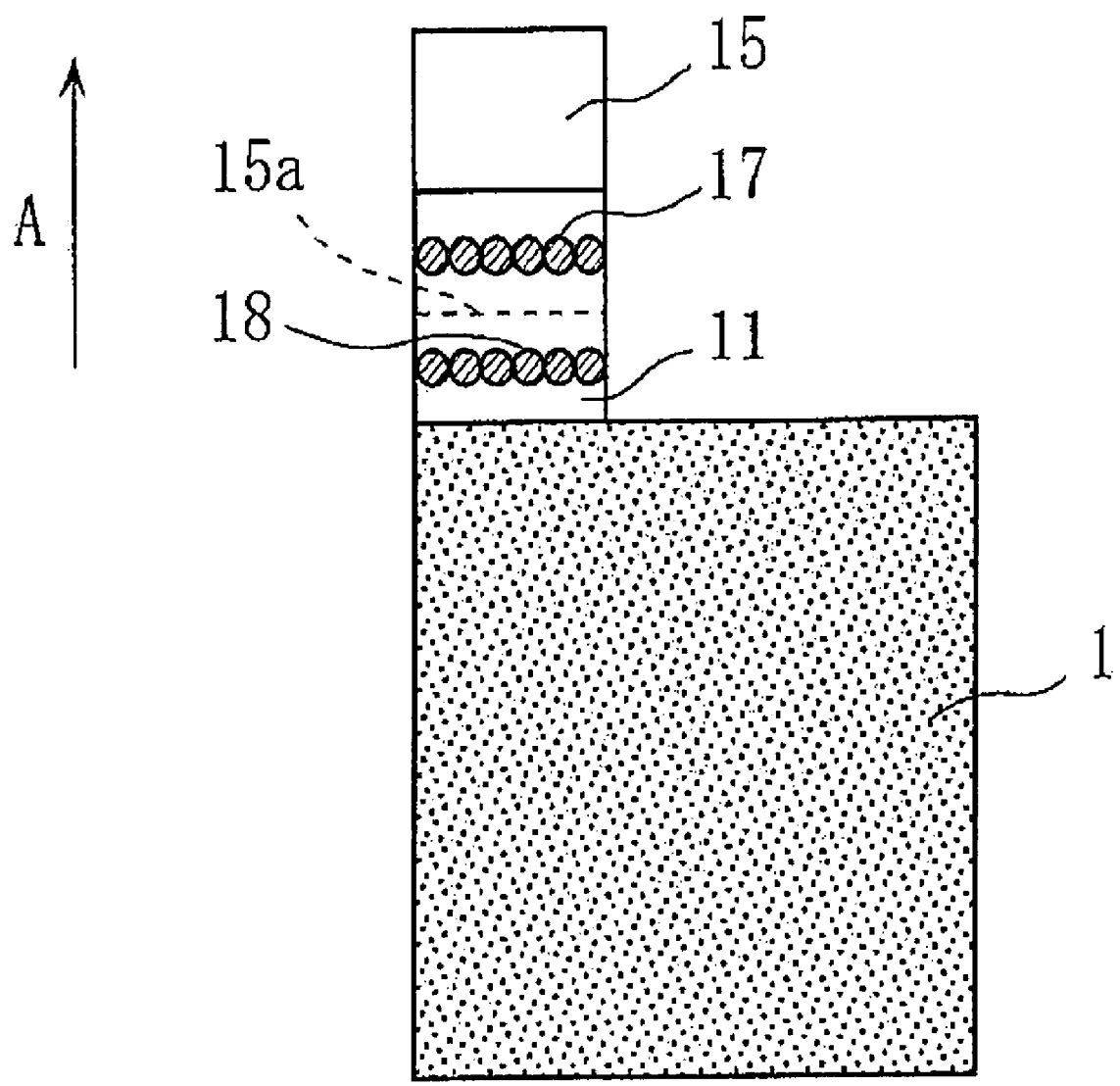
FIG. 5 is a plan view illustrating how the positive electrode current collector tabs are welded to each other and how the positive electrode current collector terminal is welded to the positive electrode current collector tabs.
Figure 8:
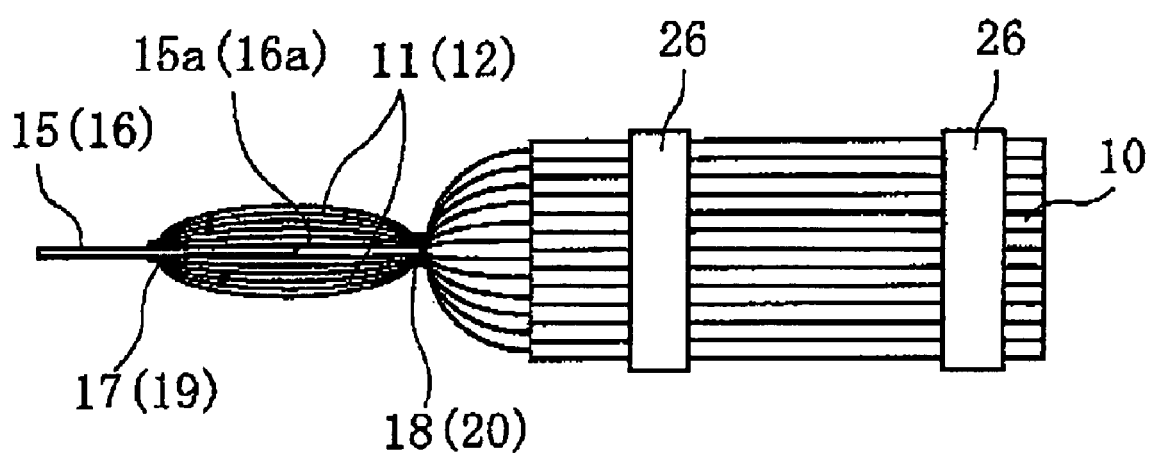
FIG. 8 is a side view illustrating a stacked electrode assembly used for a stack type battery according to the present invention.

As illustrated in FIGS. 5 and 8, a plurality of the positive electrode current collector tabs 11, which protrude from the stacked electrode assembly 10, are welded by ultrasonic welding to a positive electrode current collector terminal 15 made of an aluminum plate (thickness: 0.5 mm), with the positive electrode current collector tabs 11 being overlapped with each other on the obverse and reverse sides of the positive electrode current collector terminal 15 (weld portion 17 shown in FIGS. 5 and 8). The weld portion 17 has such a structure that six weld points in a substantially circular shape (diameter: 5 mm) are provided linearly so as to be perpendicular to the extending direction of the positive electrode current collector tabs 11 (i.e., direction A in FIG. 5). The positive electrode current collector tabs 11 that exist between the positive electrode plates 1 and an end part 15a of the positive electrode current collector terminal 15 that is on the positive electrode plate 1 side are welded to each other by ultrasonic welding (weld portion 18 shown in FIGS. 5 and 8). The weld portion 18 has such a structure that, as the above-described weld portion 17, six weld points each in a substantially circular shape (diameter: 5 mm) are provided linearly so as to be perpendicular to the extending direction of the positive electrode current collector tabs 11 (i.e., direction A in FIG. 5). The weld portion 18 is located substantially halfway between the positive electrode plates 1 and the end part 15a of the positive electrode current collector terminal 15. When the welding is effected at a substantially halfway location as described above, the weld portion 18 is prevented from stress, so such defects as peeling are prevented from occurring. The end part 15a of the positive electrode current collector terminal 15 is separated from the edge of the positive electrode plates 1 by a minimum distance equal to the diameter of a weld point 18 and by a maximum distance that is equal to the length of the current collector tabs 11 that exist between the positive electrode plates 1 and an end part 15a of the positive electrode current collector terminal 15 minus the diameter of the weld portion 17. Preferably, the end part 15a of the positive electrode current collector terminal 15 is separated from the edge of the positive electrode plates 1 by a distance that is from about 25 to 75% of the length of the current collector tabs 11 that exists between the positive electrode plates 1 and an end part 15a of the positive electrode current collector terminal 15 and, more preferably, from about 25 to 50% of this length.

Figure 6:
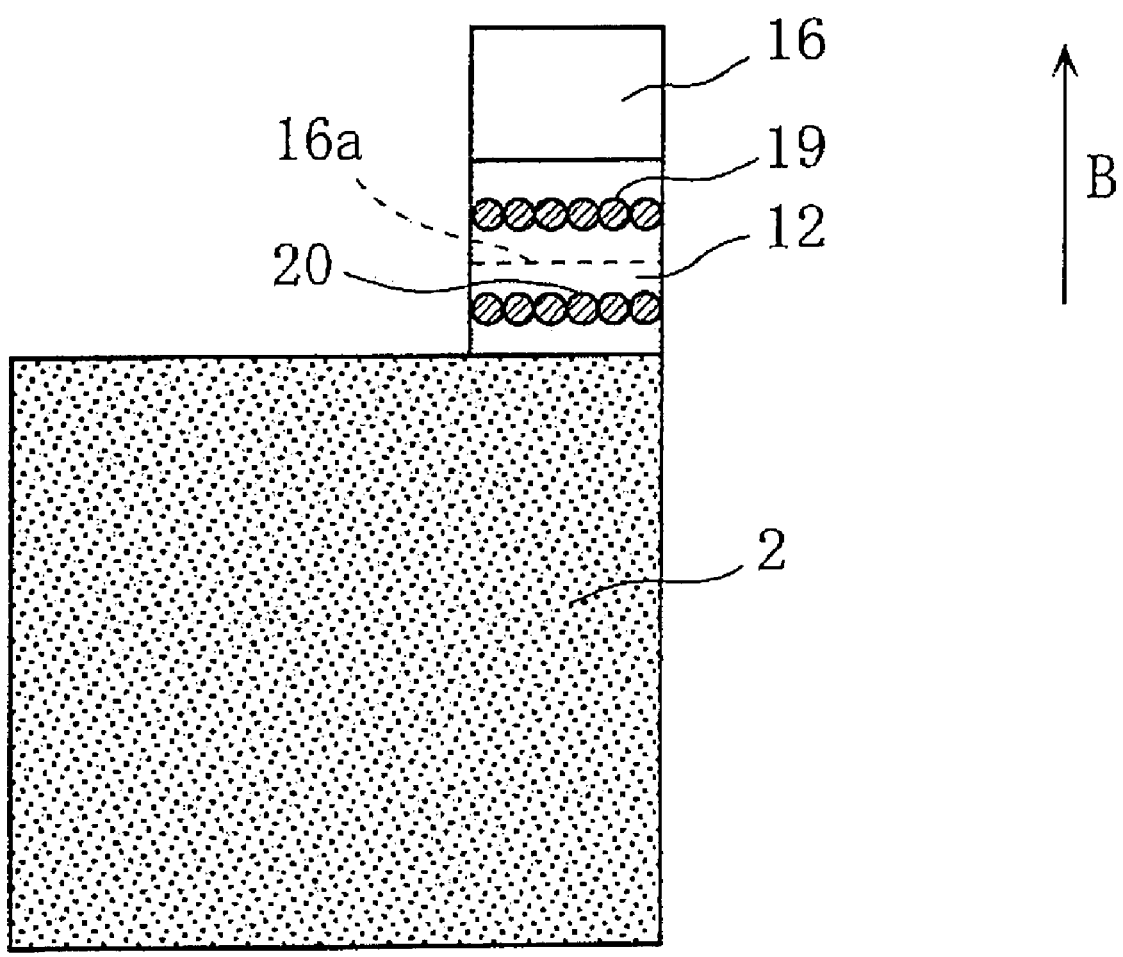
FIG. 6 is a plan view illustrating how the negative electrode current collector tabs are welded to each other and how the negative electrode current collector terminal is welded to the negative electrode current collector tabs.

On the other hand, as illustrated in FIGS. 6 and 8, a plurality of the negative electrode current collector tabs 12, which protrude from the stacked electrode assembly 10, are welded by ultrasonic welding to a negative electrode current collector terminal 16 made of a copper plate (thickness: 0.5 mm), with the negative electrode current collector tabs 11 being overlapped with each other on the obverse and reverse sides of the negative electrode current collector terminal 16 (weld portion 19 shown in FIGS. 6 and 8). The weld portion 19 has such a structure that six weld points in a substantially circular shape (diameter: 5 mm) are provided linearly so as to be perpendicular to the extending direction of the negative electrode current collector tabs 12 (i.e., direction B in FIG. 6). The negative electrode current collector tabs 12 that exist between the negative electrode plates 2 and an end part 16a of the negative electrode current collector terminal 16 that is on the negative electrode plate 2 side are welded to each other by ultrasonic welding (weld portion 20 shown in FIGS. 6 and 8). The weld portion 20 has such a structure that, as the above-described weld portion 19, six weld points each in a substantially circular shape (diameter: 5 mm) are provided linearly so as to be perpendicular to the extending direction of the negative electrode current collector tabs 12 (i.e., direction B in FIG. 6). The weld portion 20 is located substantially halfway between the negative electrode plates 2 and the end part 16a of the negative electrode current collector terminal 16. When the welding is effected at a substantially halfway location as described above, such defects as peeling are prevented from occurring in the weld portion 20 for the same reason as described above. The end part 16a of the negative electrode current collector terminal 16 is separated from the edge of the negative electrode plates 2 by a distance the same as that described above for the positive electrode current collector terminal and positive electrode plates.

Reference numeral 26 in FIG. 8 denotes a misalignment prevention tape for preventing the positive electrode plates 1 and the negative electrode plates 2 from being misaligned in the stacked electrode assembly 10. Both ends of the tape are affixed to the outermost negative electrodes 2 over the stacked electrode assembly 10.

Fabrication of Prismatic Lithium Ion Battery
Preparation of Positive Electrode Plate 90 mass % of $LiCoO_2$ as a positive electrode active material, 5 mass % of carbon black as a conductive agent, and 5 weight % of polyvinylidene fluoride as a binder agent were mixed with an N-methyl-2-pyrrolidone (NMP) solution as a solvent to prepare a positive electrode mixture slurry. Next, the resultant positive electrode mixture slurry was applied onto both sides of an aluminum foil (thickness 15 μm) serving as a positive electrode current collector. Then, the material was dried to remove the solvent and compressed with rollers to a thickness of 0.1 mm, and thereafter, it was cut into a sheet with a width L1 and a height L2 and having a positive electrode current collector tab protruding therefrom, to prepare a positive electrode plate.

Preparation of Pouch-Type Separator in which the Positive Electrode Plate is Disposed Two sheets of separators made of PP are prepared, and the positive electrode plate was disposed between the separators. Then, the peripheral parts of the separators were thermally welded, to thus prepare a pouch-type separator in which the positive electrode plate was disposed.

Preparation of Negative Electrode Plate 95 mass % of natural graphite powder as a negative electrode active material and 5 mass % of polyvinylidene fluoride as a binder agent were mixed with an NMP solution as a solvent to prepare a slurry. Thereafter, the resultant slurry was applied onto both sides of a copper foil (thickness: 10 μm) serving as a negative electrode current collector. Then, the material was dried to remove the solvent and compressed with rollers to a thickness of 0.08 mm, and thereafter, it was cut into a sheet with a width L7 and a height L8 and having a negative electrode current collector tab protruding therefrom, to prepare a negative electrode plate.

Preparation of a Battery 51 pieces of the negative electrode plates prepared in the above-described manner and 50 pieces of the pouch-type separators each containing the positive electrode plate therein were alternately stacked one upon the other, to prepare a stacked electrode assembly. It should be noted that negative electrode plates were disposed at the opposite end portions of the stacking direction in this stacked electrode assembly. Next, misalignment prevention tapes 26 were affixed on four sides of the stacked electrode assembly so as to straddle over the stacked electrode assembly.

Figure 7:
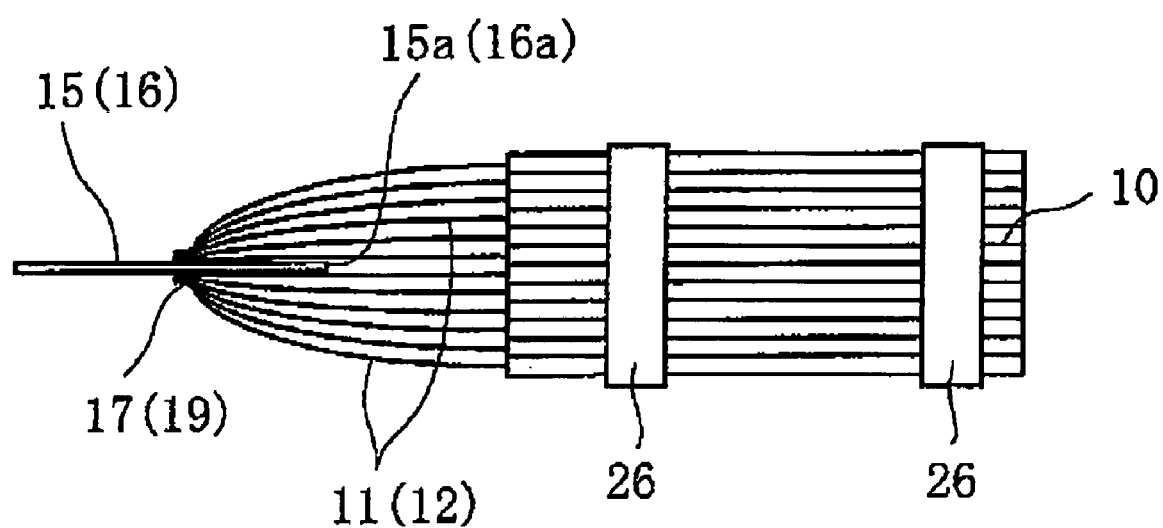
FIG. 7 is a side view of a stacked electrode assembly used for the stack type battery of the present invention, illustrating a manufacturing step thereof.

Next, as illustrated in FIG. 7, 50 pieces of the positive electrode current collector tabs 11 protruding from the stacked electrode assembly were welded to the positive electrode current collector terminal 15 by ultrasonic welding under the conditions set forth in Table 1 below. At this time, 25 pieces of the positive electrode current collector tabs 11 were disposed on one side of the positive electrode current collector terminal 15 and welded thereto, while 25 pieces of the positive electrode current collector tabs 11 were disposed on the other side of the positive electrode current collector terminal 15 and welded thereto (weld portion 17). Likewise, 51 pieces of the negative electrode current collector tabs 12 protruding from the stacked electrode assembly were welded to the negative electrode current collector terminal 16 by ultrasonic welding under the conditions set forth in Table 1 below. At this time, 26 pieces of the negative electrode current collector tabs 12 were disposed on one side of the negative electrode current collector terminal 16 and welded thereto, while 25 pieces of the negative electrode current collector tabs 12 were disposed on the other side of the negative electrode current collector terminal 16 and welded thereto (weld portion 19).

Thereafter, the positive electrode current collector tabs 11 existing between the positive electrode plates 1 and the end part 15a of the positive electrode current collector terminal 15 that is on the positive electrode plate 1 side, and the negative electrode current collector tabs 12 existing between the negative electrode plates 2 and the end part 16a of the negative electrode current collector terminal 16 that is on the negative electrode plate 2 side, were welded respectively to each other by ultrasonic welding under the conditions as set forth in Table 1 below.

TABLE 1

| | Positive electrode side (Both of the materials are aluminum) | | Negative electrode side (Both of the materials are copper) | |
|---|---|---|---|---|
| | Positive electrode tab + Positive electrode current collector terminal | Positive electrode tab only | Negative electrode tab + Negative electrode current collector terminal | Negative electrode tab only |
| Number of weld points | 6 locations × 2 (6 locations per each of obverse and reverse sides) | 6 locations | 6 locations × 2 (6 locations per each of obverse and reverse sides) | 6 locations |
| Weld area | 5 mm in diameter/each weld point | | | |
| Pressure | 0.15 MPa | | | |
| Frequency | 20 kHz | | | |
| Duration | 0.3 sec. | | | |
| Energy amount | 50 J | 30 J | 50 J | 30 J |

Thereafter, the stacked electrode assembly 10 was disposed between two pieces of laminate films 28 in a rectangular shape, and then, while the positive electrode current collector terminal 15 and the negative electrode current collector terminal 16 were kept protruding from the laminate films 28, the laminate films 28 were welded to each other at one side of the laminate films in which the positive and negative electrode current collector terminals were being present. Subsequently, the laminate films 28 were welded to each other at two sides of the remaining three sides of the laminate films 28, so that the stacked electrode assembly 10 was disposed inside the battery case 25. Lastly, a non-aqueous electrolyte solution was filled into the battery case 25 through the opening of the battery case 25, and thereafter, the opening of the battery case 25 (the remaining one of the sides of the laminate films 28) was welded to complete a battery. The above-mentioned non-aqueous electrolyte solution was prepared by dissolving $LiPF_6$ at a concentration of 1 M (mole/liter) in a mixed solvent of 30:70 volume ratio of ethylene carbonate (EC) and methyl ethyl carbonate (MEC).

EXAMPLE

A battery fabricated in the same manner as described in the foregoing embodiment was used as the stack type battery of this Example. The design capacity of this battery was 12 Ah.

The battery fabricated in this manner is hereinafter referred to as Battery A of the invention.

Comparative Example

A battery was fabricated in the same manner as described in the above Example except that neither the positive electrode current collector tabs 11 nor the negative electrode current collector tabs 12 were welded to each other by ultrasonic welding (i.e., the weld portions 18 and 20 shown in FIG. 8 were not provided; in other words, the battery is in the state shown in FIG. 7). The design capacity of this battery was 12 Ah.

The battery fabricated in this manner is hereinafter referred to as Comparative Battery Z.

Experiment

Figure 9:
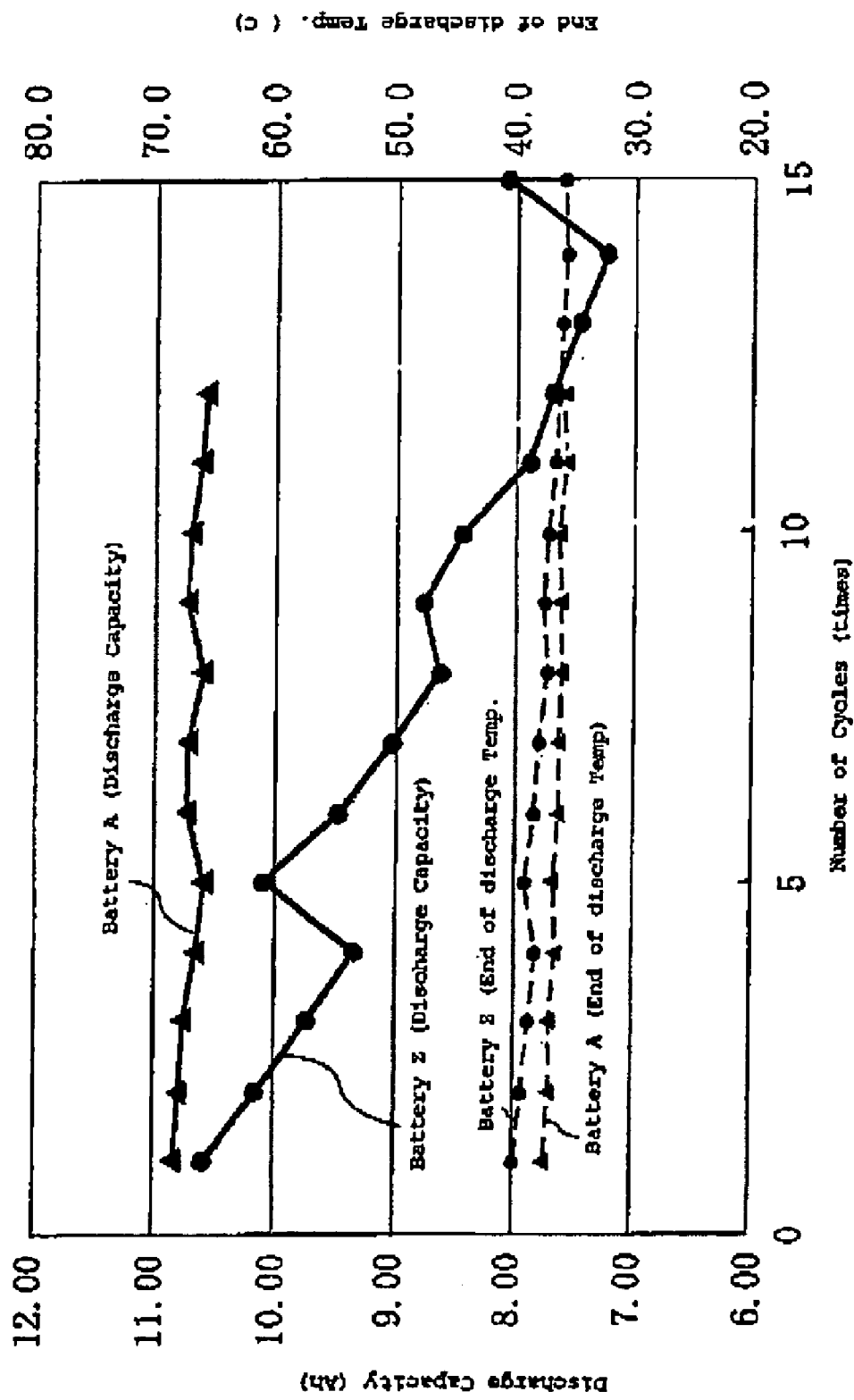
FIG. 9 is a graph illustrating cycle performance of Battery A of the invention and Comparative Battery Z.

The charge-discharge cycle characteristics (discharge capacity and end-of-discharge temperature at each cycle) were determined for each of Battery A1 of the invention and Comparative Battery Z1. The results are shown in FIG. 9. The charge-discharge conditions were as follows.

Charge-Discharge Conditions

Charge Conditions

Each of the batteries was charged at a constant current of 12 A until the battery voltage reached 4.2 V and thereafter charged at a constant voltage of 4.2 V until the current value reached 1 A. Each battery was rested for 5 minutes after the charge.

Discharge Conditions

Each of the batteries was discharged at a constant current of 120 A until the battery voltage reached 2.5 V. It should be noted that each battery was rested for 30 minutes after the discharge (except after the discharge at the 4th, the 8th, and the 14th cycles, wherein the battery was rested for 12 to 36 hours).

Analysis

The results shown in FIG. 9 clearly demonstrate that Comparative Battery Z showed a considerable decrease in capacity as the charge-discharge cycles were repeated. In contrast, Battery A of the invention did not show a significant decrease in capacity even after the charge-discharge cycles were repeated.

The reason is as follows. In Comparative Battery Z, the current collector tabs are not welded (i.e., the weld portions 18 and 20 shown in FIG. 8 are not provided), and therefore, the current values flowing through the electrode plates become uneven. As a consequence, uneven distribution of the charge-discharge conditions occurs in the battery, resulting in partial overdischarge and overcharge. In contrast, in Battery A of the invention, the current collector tabs are welded (i.e., the weld portions 18 and 20 shown in FIG. 8 are provided), and therefore, the current values flowing through the electrode plates are made uniform. As a result, uneven distribution of the charge-discharge conditions is prevented in the battery, and the partial overdischarge and overcharge are prevented.

In addition, Battery A of the invention exhibited lower end-of-discharge temperatures than Comparative Battery Z because of the reasons as described above.

Other Embodiments (1) In the foregoing example, the weld portion 18 of the positive electrode current collector tabs 11 to each other is constituted by six weld points. However, the purpose of the present invention may be accomplished when one or more weld points are provided. Nevertheless, it is preferable that a plurality of weld points be provided in order to ensure a sufficient welding strength. This also applies to the weld portion 20 for welding the negative electrode current collector tabs 12 to each other.

Figure 10:
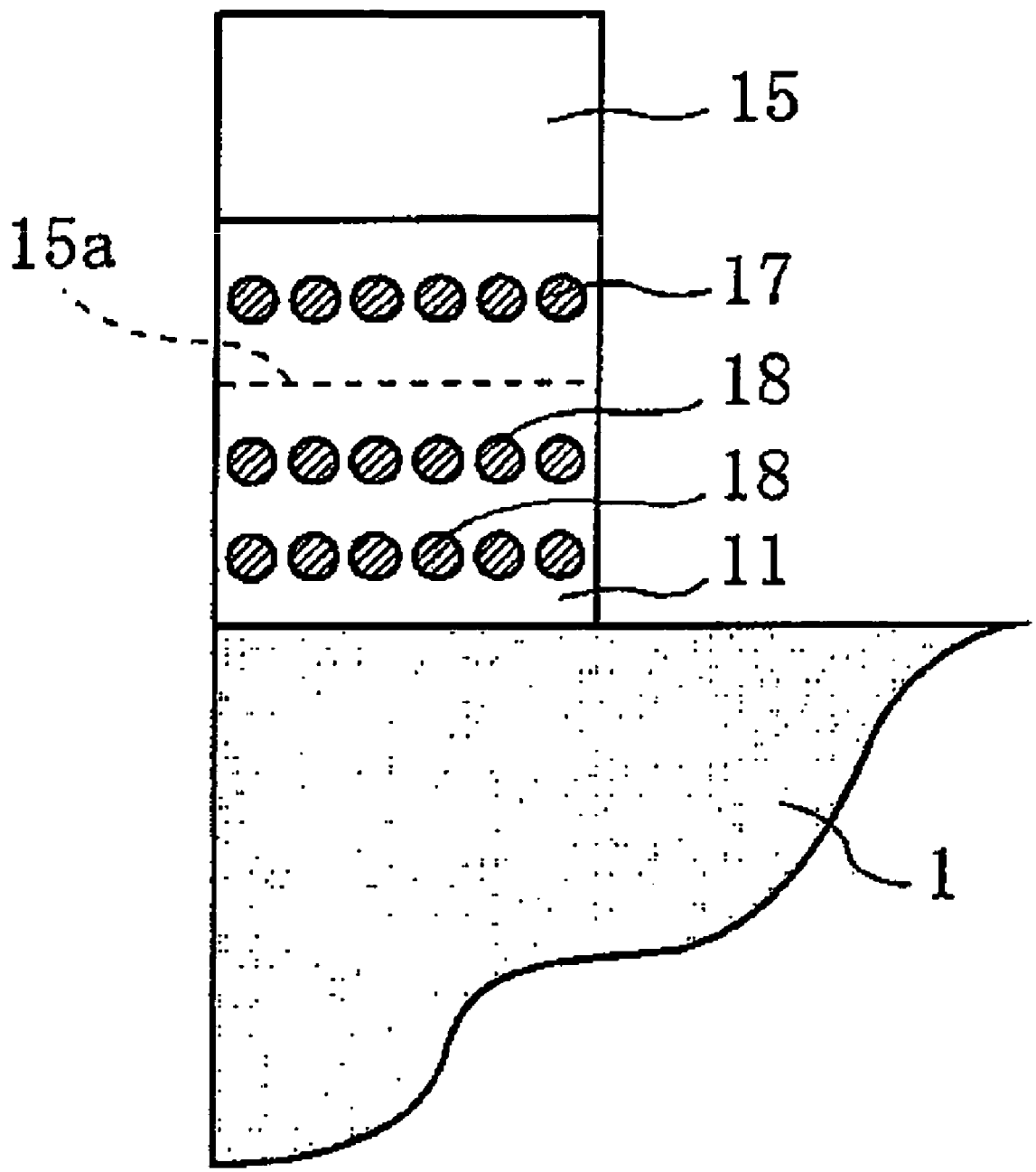
FIG. 10 is a plan view illustrating a modified example of how the positive electrode current collector tabs are welded to each other and how the positive electrode current collector terminal is welded to the positive electrode current collector tabs.

(2) In the foregoing example, only one weld portion 18 is provided for welding the positive electrode current collector tabs 11 to each other, but this is merely illustrative. As illustrated in FIG. 10, two or more weld portions 18 may be provided between the positive electrode plates 1 and the end part 15*a* of the positive electrode current collector terminal 15 that is on the positive electrode plate 1 side. This also applies to the weld portion 20 for welding the negative electrode current collector tabs 12 to each other.

(3) The positive electrode current collector tabs 11 and the negative electrode current collector tabs 12 are welded respectively to each other by ultrasonic welding, but the method of welding is not limited to such a method. Any method of joining, such as thrust-and-press clamping, may be employed as long as the positive electrode current collector tabs 11 and/or the negative electrode current collector tabs 12 are electrically connected respectively to each other.

(4) In the foregoing example, 50 pieces of the positive electrode plates and 51 pieces of the negative electrode plates were used, but the battery is not intended to be limited to such a structure. That said, when the number of each of the positive electrode plates and the negative electrode plates is 30 or greater, weldability of the weld portion between the positive/negative current collector terminal and the positive/negative current collector tabs tend to be particularly poor, so in such a case, the present invention is very effective.

(5) In the foregoing example, the positive electrode current collector terminal 15 is made of an aluminum plate and the negative electrode current collector terminal 16 is made of a copper plate, but each of these terminals may be made of a nickel plate. When both the current collector terminals are made of the same material, manufacturing costs of the battery can be reduced. When such a construction is employed, weldability of the weld portions tends to be poorer because different kinds of metals need to be welded to each other (note that the positive electrode current collector tabs 11 are made of aluminum while the negative electrode current collector tabs 12 are made of copper), so the problem of variations in the connection resistance values between the positive/negative electrode current collector terminals and the positive/negative electrode plates becomes more conspicuous. Thus, the above-described configuration of the invention can prevent such a problem and is therefore particularly useful.

Figure 11:
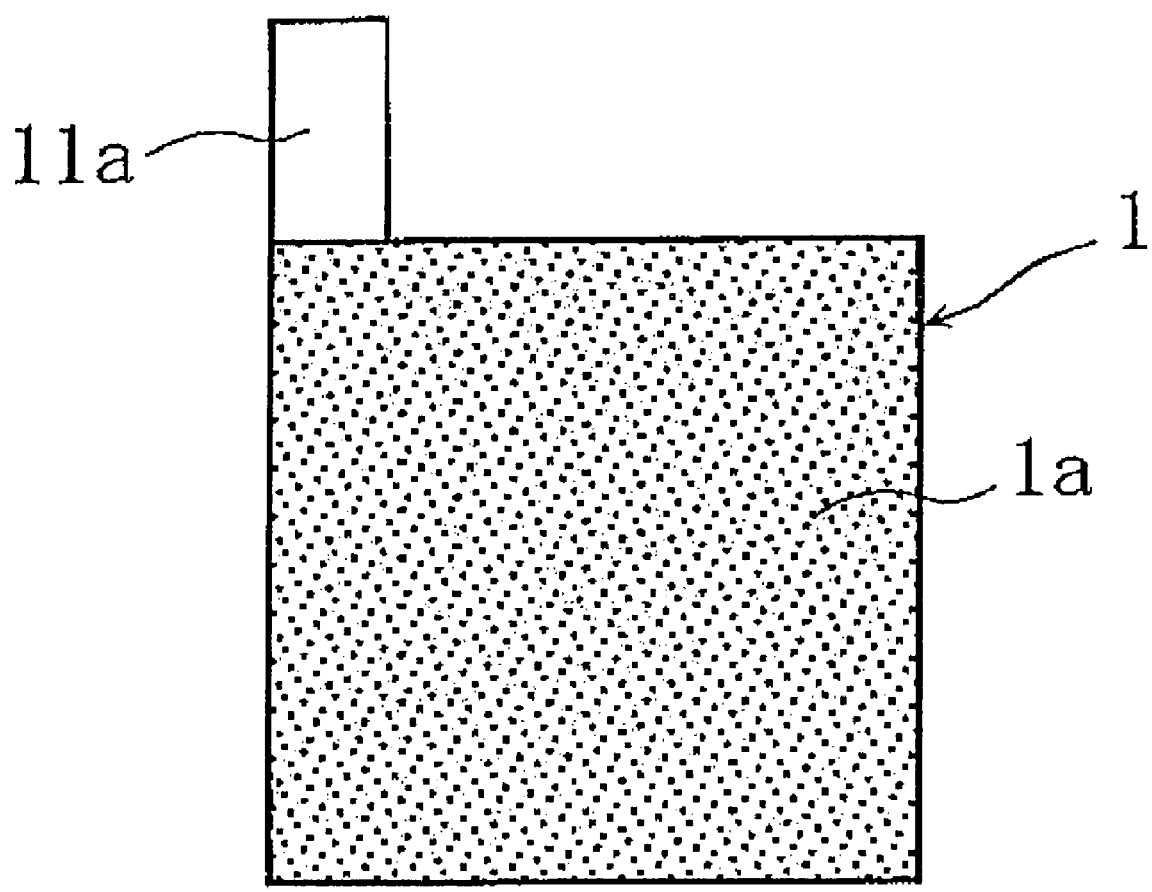
FIG. 11 is a plan view of a modified example of the positive electrode plate used for the stack type battery according to the present invention.
Figure 12:
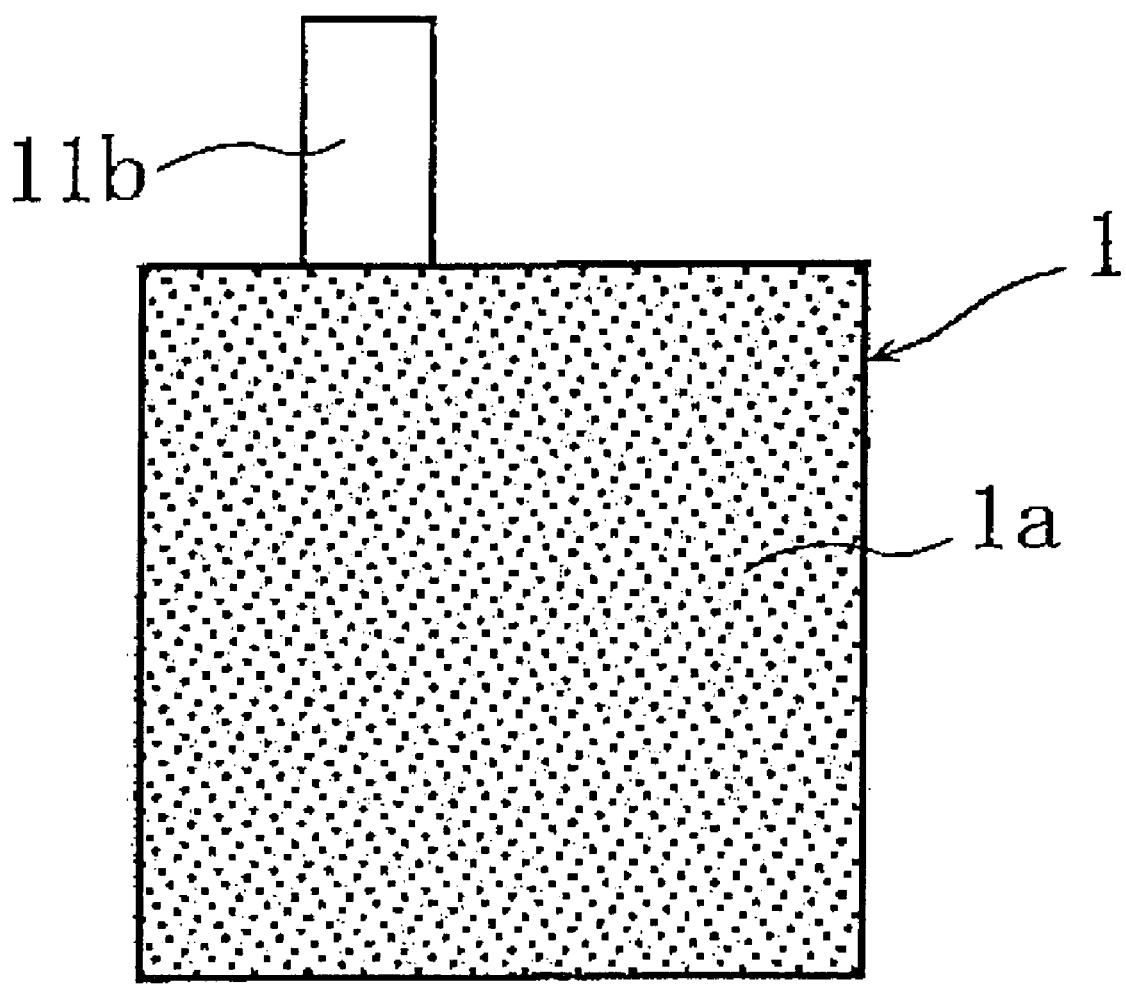
FIG. 12 is a plan view of another modified example of the positive electrode plate used for the stack type battery according to the present invention.
Figure 13:
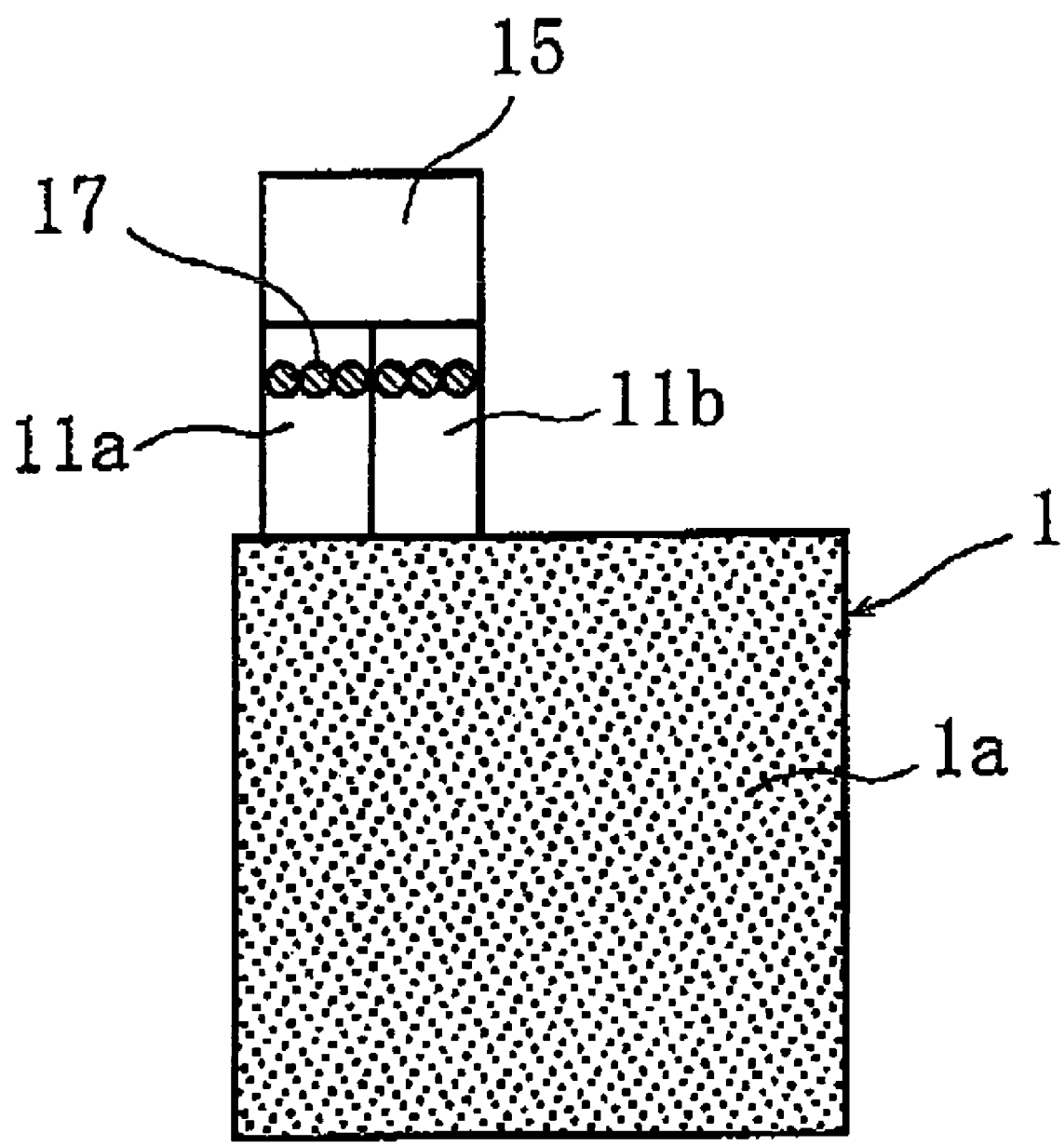
FIG. 13 is a plan view of a modified example of the stack electrode assembly used for the stack type battery according to the present invention.

(6) In order to prevent variations in the connection resistance values between the positive/negative electrode plates and the positive/negative electrode current collector terminal, the following method may be employed, for example. Positive electrode plates 1 each having a narrow-width positive electrode current collector tab 11*a* as shown in FIG. 11 and positive electrode plates 1 each having a narrow-width positive electrode current collector tab 11*b* as shown in FIG. 12 should be prepared. The number of the positive electrode plates 1 having the positive electrode current collector tab 11*a* to be prepared is half of the number of the stacked positive electrode plates required, and likewise, the number of the positive electrode plates 1 having the positive electrode current collector tab 11*b* to be prepared is half of the number of the stacked positive electrode plates required (e.g., when the number of the positive electrode plates 1 is 50 as in the foregoing example, 25 pieces of the positive electrode plates 1 need to be prepared). Then, as illustrated in FIG. 13, the positive electrode current collectors tab 11*a* and 11*b* are welded to the positive electrode current collector terminal 15 so that the positive electrode current collector tabs 11*a* and the positive electrode current collector tabs 11*b* do not overlap with each other. In this method as well, variations in the connection resistance values between the positive electrode plates 1 and the positive electrode current collector terminal 15 can be prevented. By employing the same configuration for the negative electrode plates 2, the same advantageous effects are obtained for the negative electrode plates 2. Nevertheless, the resistance is slightly higher than the configuration shown in the foregoing example because the width of each of the positive electrode current collector tabs 11*a* and 11*b* is narrower. Therefore, the structure shown in the foregoing example is more desirable.

(7) The positive electrode active material is not limited to the $LiCoO_2$, but other substances such as $LiNiO_2$, $LiMn_2O_4$, and combinations thereof may also be employed. The negative electrode active materials are not limited to natural graphite as described above, but other substances such as artificial graphite may also be employed.

(8) In the foregoing example, the negative electrode active material layer was formed on both sides of the negative electrode conductive current collector in all the negative electrode plates 2. However, the negative electrode active material layers in the portions that do not face the positive electrode plates (specifically, the negative electrode active material layers on the outer sides of the outermost negative electrode plates) may be eliminated. Such a configuration allows the thickness of the stacked electrode assembly to be less, making it possible to achieve a higher capacity density of the battery.

The present invention may be applied to, for example, batteries used for such equipment as robots, electric vehicles, and backup power sources.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims the priority under 35 U.S.C. §119 of Japanese patent application No. 2007-253460 filed Sep. 28, 2007, which is incorporated by reference herein.

What is claimed is:

1. A stack type battery comprising:
a stacked electrode assembly having a plurality of positive electrode plates, a plurality of negative electrode plates, and separators, the positive electrode plates and the negative electrode plates being alternately stacked one upon the other with the separators interposed therebetween;
positive electrode current collector tabs each made of a metal foil and extending outward from the plurality of positive electrode plates;
negative electrode current collector tabs each made of a metal foil and extending outward from the plurality of negative electrode plates;
a plate-shaped positive electrode current collector terminal; and
a plate-shaped negative electrode current collector terminal,
all of the positive electrode current collector tabs being overlapped with each other and welded to the plate-shaped positive electrode current collector terminal in said overlapped arrangement, and all of the negative electrode current collector tabs being overlapped with each other and welded to the plate-shaped negative electrode current collector terminal in said overlapped arrangement, wherein the positive electrode current collector tabs existing between the positive electrode plates and an end part of the positive electrode current collector terminal that is on the positive electrode plate side are joined to each other by welding, and/or the negative electrode current collector tabs existing between the negative electrode plates and an end part of the negative electrode current collector terminal that is on the negative electrode plate side are joined to each other by welding.

2. The stack type battery according to claim 1, wherein the number of each of the positive electrode plates and the negative electrode plates is 30 or greater.

3. The stack type battery according to claim 1, wherein the joining is effected by ultrasonic welding.

4. The stack type battery according to claim 1, wherein the joining is effected at a substantially halfway location between the positive electrode plates and the end part of the positive electrode current collector terminal that is on the positive electrode plate side and/or at a substantially halfway location between the negative electrode plates and the end part of the negative electrode current collector terminal that is on the negative electrode plate side.

5. The stack type battery according to claim 1, wherein the joining is effected at a plurality of locations.

6. The stack type battery according to claim 5, wherein the plurality of joining locations are disposed linearly so as to be perpendicular to an extending direction of the positive electrode current collector tabs or the negative electrode current collector tabs.

7. The stack type battery according to claim 1, wherein a positive electrode active material of the positive electrode plates and a negative electrode active material used of the negative electrode plates comprise a material capable of intercalating and deintercalating lithium.

\* \* \* \* \*